(12) United States Patent
Zhang

(10) Patent No.: US 12,517,307 B2
(45) Date of Patent: Jan. 6, 2026

(54) FIBER OPTIC CONNECTOR AND ITS ASSEMBLY

(71) Applicant: WUHAN UF OPTOELECTRIC TECHNOLOGY CO., LTD, Wuhan (CN)

(72) Inventor: Di Zhang, Xi'an (CN)

(73) Assignee: WUHAN UF OPTOELECTRIC TECHNOLOGY CO., LTD, Wuhan (CN)

(*) Notice: Subject to any disclaimer, the term of this patent is extended or adjusted under 35 U.S.C. 154(b) by 729 days.

(21) Appl. No.: 18/271,895

(22) PCT Filed: Oct. 30, 2020

(86) PCT No.: PCT/CN2020/125086
§ 371 (c)(1),
(2) Date: Jul. 12, 2023

(87) PCT Pub. No.: WO2021/120882
PCT Pub. Date: Jun. 24, 2021

(65) Prior Publication Data
US 2024/0085637 A1    Mar. 14, 2024

(30) Foreign Application Priority Data
Dec. 19, 2019 (CN) .......................... 201911319659.2

(51) Int. Cl.
G02B 6/38 (2006.01)
(52) U.S. Cl.
CPC ......... *G02B 6/3831* (2013.01); *G02B 6/3825* (2013.01)

(58) Field of Classification Search
CPC ........................... G02B 6/3831; G02B 6/3825
See application file for complete search history.

(56) References Cited

U.S. PATENT DOCUMENTS 10,156,685 B2 * 12/2018 Wu ...................... G02B 6/3825
2018/0292618 A1    10/2018 Chang et al.

FOREIGN PATENT DOCUMENTS

| CN | 101501545 A | 8/2009 |
| CN | 104965262 A | 10/2015 |
| CN | 107193087 A | 9/2017 |
| CN | 206584077 U | 10/2017 |
| CN | 108693605 A | 10/2018 |

(Continued)

*Primary Examiner* — Tina Wong
(74) *Attorney, Agent, or Firm* — Bayramoglu Law Offices LLC

(57) ABSTRACT

A fiber optic connector and its assembly include a connector terminal and an adapter terminal. The connector terminal includes a connection housing, a ferrule assembly is provided in the connection housing, and a locking fastener and a backstop configured to fix the ferrule assembly are further provided in the connection housing. The locking fastener includes an elastic catch extending from a side wall of the connection housing. The adapter terminal includes an adapter housing made of an electromagnetic shielding material. The adapter housing is provided with a connection cavity corresponding to the connection housing, a locking structure matched with the elastic catch is provided in the connection cavity, and an adapter port in abutting joint with the ferrule assembly is further provided in the connection cavity.

8 Claims, 13 Drawing Sheets

(56) References Cited

FOREIGN PATENT DOCUMENTS

| CN | 109254356 A | 1/2019 |
| CN | 109932786 A | 6/2019 |
| CN | 110824628 A | 2/2020 |

* cited by examiner

FIBER OPTIC CONNECTOR AND ITS ASSEMBLY

CROSS REFERENCE TO THE RELATED APPLICATIONS

This application is the national phase entry of International Application No. PCT/CN2020/125086, filed on Oct. 30, 2020, which is based upon and claims priority to Chinese Patent Application No. 201911319659.2, filed on Dec. 19, 2019, the entire contents of which are incorporated herein by reference.

TECHNICAL FIELD

The present disclosure relates to the technical field of communications, and in particular, to a fiber optic physical docking adapter in a miniaturized package and a connector thereof, especially a fiber optic connector and its assembly.

BACKGROUND

The connection between optical fibers and the connection between the optical fibers and a device are basically implemented through a connector. With explosive growth of the information Internet and cloud services, the requirements for connection density of the optical fibers are also increasing, that is, more optical fibers must be connected per unit volume.

There are currently three major problems with a fiber optic connector:

I. It is complex to unlock the fiber optic connector from an adapter, which brings great difficulties to a fiber optic connector project with a high-density layout. For example, when a common lucent connector (LC) is unlocked, a connector elastic piece needs to be pressed down first and then pulled rearward, so as to unlock the LC from an LC adapter. For another example, when a common standard connector (ST) is unlocked, the ST is rotated first and then pulled back, so as to unlock the ST from an ST adapter.

II. At present, the number of light exit channels per unit volume of an active module continues to increase. According to the current size of a laser chip and receiver chip, the width of the active module restricts the number of connector interfaces arranged on an end surface of the active module. Then a small-width fiber optic connector is a very urgent market demand, especially in the situation of quad small form pluggable double density (QSFP-DD) packaging, the solution of arranging four connectors in a width direction is imminent.

III. The active module is a photoelectric integrated module. Most of on-site wiring forms are integrated wiring in a central computer room. Electromagnetic interference from adjacent active modules is not allowed, which is also a direction that the industry's R&D engineers have been working on in terms of electromagnetic shielding. At present, an effective way to solve the electromagnetic shielding is to employ a metal material for electromagnetic isolation. At present, most connector interfaces need to be provided with elastic buckles at an adapter terminal, namely a source module terminal, such as an SC and a multi-position connector (MPO). However, the elastic characteristics of these elastic buckles require that the employed material is a plastic material with good reliability and elasticity for local use. The current plastic material is very deficient in the isolation of electromagnetic shielding. If there is an adapter that allows a structure without an elastic buckle, the adapter can avoid the use of a material with poor electromagnetic shielding performance.

Therefore, the existing connector assembly still needs improvement, and its structure and usage method should be optimized to simplify the structure of an adapter connection assembly and optimize its use effect. Therefore, a more reasonable technical solution needs to be proposed to solve the technical problems existing in the prior art.

SUMMARY

The present disclosure provides a fiber optic connector and its assembly. By improving the structure of a connector terminal, the problem of connection and transmission effect of an adapter port of an active module is solved, and the problem of electromagnetic shielding of the active module can be taken into account while satisfying stable connection of the connector.

To achieve the above effects, the present disclosure adopts the following technical solutions:

A fiber optic connector and its assembly, including a connector terminal and an adapter terminal, where the connector terminal includes a connection housing, a ferrule assembly is provided in the connection housing, a locking fastener and a backstop configured to fix the ferrule assembly are further provided in the connection housing, the locking fastener includes an elastic catch extending from a side wall of the connection housing, the adapter terminal includes an adapter housing, the adapter housing is provided with a connection cavity corresponding to the connection housing, a locking structure matched with the elastic catch is provided in the connection cavity, an adapter port in abutting joint with the ferrule assembly is further provided in the connection cavity, and the connector terminal moves forward or backward in a straight line to be connected to or disconnected from the adapter terminal.

According to the disclosed connector and its assembly, the adapter terminal is made of an electromagnetic shielding material and can resist electromagnetic interference, and the connector terminal is configured to perform connection and fixation, thereby solving the current defect of electromagnetic interference when a plurality of fiber optic connectors are connected in parallel. Meanwhile, the arranged locking fastener provides a secure connection in one directional dimension, and only needs to move forward or backward to implement connection or disconnection of the connector terminal and the adapter terminal, thereby avoiding complicated multi-directional operation to implement the connection. Moreover, such a locking fastener structure makes the size of the connector terminal extend in a longitudinal direction and reduce in a transverse width, such that the connector has a plurality of optical fibers connected in parallel within a smaller size, thereby meeting the current packaging size requirements.

Furthermore, when the connection housing and the adapter terminal are connected, the size of the connection housing can be set to be smaller than that of the adapter terminal, which has the advantage of making the junction cleaner and smaller in size. Specifically, to optimize the structure of the connection housing, the following feasible solution is listed: the connection housing includes a front part and a rear part, a width of the front part is smaller than that of the rear part, the width of a transitional junction from the front part to the rear part gradually increases, and the front part is inserted into the connection cavity and locked.

Furthermore, the above technical solution explains a structure that the elastic catch of the locking fastener extends from a side wall of the connection housing and can be rebounded and retracted relative to the connection housing. The above effect can be achieved in various ways. The following feasible solution is listed herein: a first slot is formed in a side wall at the front part of the connection housing, and the elastic catch of the locking fastener extends from the first slot and can be elastically retracted into the first slot.

Preferably, the first slots are symmetrically arranged on the connection housing. When the connection housing is configured as a square structure, the first slots can be arranged on upper and lower side walls of the connection housing, then two corresponding elastic catches can be synchronously arranged and respectively extend from the upper and lower first slots. Such arrangement can not only realize cooperative locking between the elastic catch and the adapter end, but also make the locking fastener extend in an up-down direction, which reduces the width of the locking fastener and further reduces the overall width of the connection housing.

Furthermore, the structure of the locking fastener disclosed in the above technical solution is optimized to achieve a connection function. The following feasible solution is listed herein: the locking fastener includes a body portion and a plurality of forward extension arms provided on the body portion, the body portion is provided with a first orientation hole, and the elastic catch is disposed on the forward extension arm. When the ferrule assembly is arranged, the first orientation hole is configured to perform fixation and guidance to ensure that after the connector terminal is in abutting joint with the adapter terminal, the ferrule assembly advances in a predetermined direction and is aligned and connected to the adapter port of the adapter terminal.

Furthermore, when the connector terminal is aligned and connected to the adapter terminal, the connection housing is held by hand, and is pushed into the connection cavity of the adapter terminal. During forward movement of the connection housing, the connection housing drives the locking fastener to move forward. To realize this cooperative relationship, various feasible solutions can be adopted. The following feasible solution is listed: the forward extension arm is provided with a forward pushing boss, the forward pushing boss is in contact with a rear side wall of the first slot, and when the connection housing moves forward to be inserted into the connection cavity, the first slot is matched with the forward pushing boss and drives the locking fastener to move forward to push the elastic catch to the locking structure to implement matching.

Furthermore, after the locking fastener moves forward, the forward extension arm and the adapter terminal are connected and matched, a structure on the forward extension arm is connected to the adapter terminal to implement clamping, and a role in preventing loosening and retreat can be played. A feasible solution is listed herein: the forward extension arm is provided with a retreat boss, the connection housing is provided with a retreat matching structure matched with the retreat boss, and when the connection housing retreats away from the connection cavity, the retreat matching structure pushes the retreat boss and enables elastic deformation of the forward extension arm to remove the matching between the elastic catch and the locking structure.

Preferably, the retreat bosses are symmetrically arranged on both sides of the forward extension arm, and corresponding retreat inclined surfaces are provided on the retreat bosses. The retreat inclined surfaces are in contact with the retreat matching structure on the connection housing to push the retreat bosses to move laterally, such that the forward extension arm is bent into the connection housing, the elastic catch sinks into the connection housing, and the matching between the elastic catch and the locking structure is removed.

Furthermore, the retreat matching structure guides the lateral movement of the retreat bosses to drive the forward extension arm to bend, such that the forward extension arm automatically sinks. The retreat matching structure disclosed in the above technical solution is optimized herein. The following feasible solution is listed: the retreat matching structure includes a matching boss or a matching guide groove, and the matching boss or the matching guide groove is matched with the retreat boss and drives the elastic deformation of the forward extension arm to sink the elastic catch into the first slot.

Preferably, the matching boss is arranged on the inner side wall of the connection housing. When the matching between the connector terminal and the adapter terminal needs to be removed, the connection housing is pulled outward, and at this time, the matching boss pushes the retreat boss to drive deformation of the forward extension arm, thereby removing the connection between the elastic catch and the locking structure. Similarly, the principle of the matching groove is also the same.

Furthermore, the backstop and the locking fastener cooperate to orient the ferrule assembly, and the backstop can be oriented through the connection housing or the locking fastener. Therefore, the body portion disclosed in the above technical solution is optimized. The following feasible solution is listed: the body portion of the locking fastener is provided with a rear pull arm, and the backstop is connected and fixed to the rear pull arm, is provided with a second orientation hole, and is in clamping fit with the rear pull arm.

Preferably, the rear pull arm is provided with a clamping hole, and the backstop is provided with a clamping table correspondingly matched with the clamping hole. The rear pull arms are arranged in groups to clamp and fasten the backstop.

Furthermore, the structure of the ferrule assembly disclosed in the above technical solution is optimized. The following feasible solution is listed: the ferrule assembly includes a tail handle matched with the first orientation hole and the second orientation hole, the tail handle is further provided with a pretightening elastic member, the pretightening elastic member has one end butting against the backstop and the other end butting against the tail handle, a ferrule is sleeved in the tail handle, and an optical fiber is connected into the ferrule.

Preferably, the structure of the ferrule assembly disclosed in the above technical solution is optimized. The following feasible solution is listed: there are one, two or more ferrule assemblies.

Preferably, the tail handle includes a front segment and a rear segment. The front segment is sleeved with the first orientation hole, and the rear segment is sleeved with the second orientation hole. The size of the front segment is larger than that of the rear segment, and then the pretightening elastic member abuts against a junction between the front segment and the rear segment.

Furthermore, the locking structure disclosed in the above technical solution is optimized. The following feasible solution is listed: the locking structure includes a locking groove or a locking hole, the locking groove or the locking hole is communicated with the connection cavity, and when the forward extension arm extends into the connection cavity and is locked, the elastic catch is snap-fitted into the locking groove or the locking hole.

Compared with the prior art, the present disclosure has the following advantages:

In the present disclosure, the locking fastener is provided in the connection housing, and adopts the forward extension arm which is arranged in one direction and can be buckled by means of relative bending deformation, and the width of the locking fastener is reduced, such that the width of the connector terminal is reduced, and the size of the junction is greatly reduced. Meanwhile, the connecting housing end is provided with the forward extension arm for elastic connection and clamping, and the connection and disconnection between the connector terminal and the adapter terminal can be realized only by moving forward or backward along a straight line, such that the operation mode is simpler. After the structure of the locking fastener is arranged, the adapter terminal does not need to be provided with an elastic buckle any more, which makes the material selection of the adapter terminal more extensive, and then enables the adapter to be set as an electromagnetic shielding structure. The simple and ingenious structure solves the problem of connection, and also solves the problem of electromagnetic interference at the adapter terminal.

BRIEF DESCRIPTION OF THE DRAWINGS

To describe the technical solutions in the embodiments of the present disclosure more clearly, the drawings required for describing the embodiments are briefly described below. It should be understood that the following drawings show merely some embodiments of the present disclosure, and thus should not be regarded as a limitation to the scope. A person of ordinary skill in the art may still derive other related drawings from these drawings without creative efforts.

Figure 1:
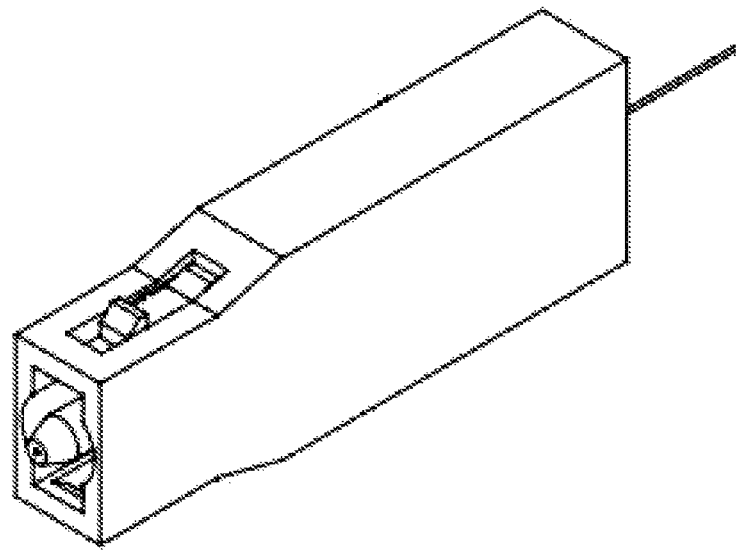
FIG. 1 is a schematic diagram showing an overall structure of a connector and its assembly.
Figure 2:
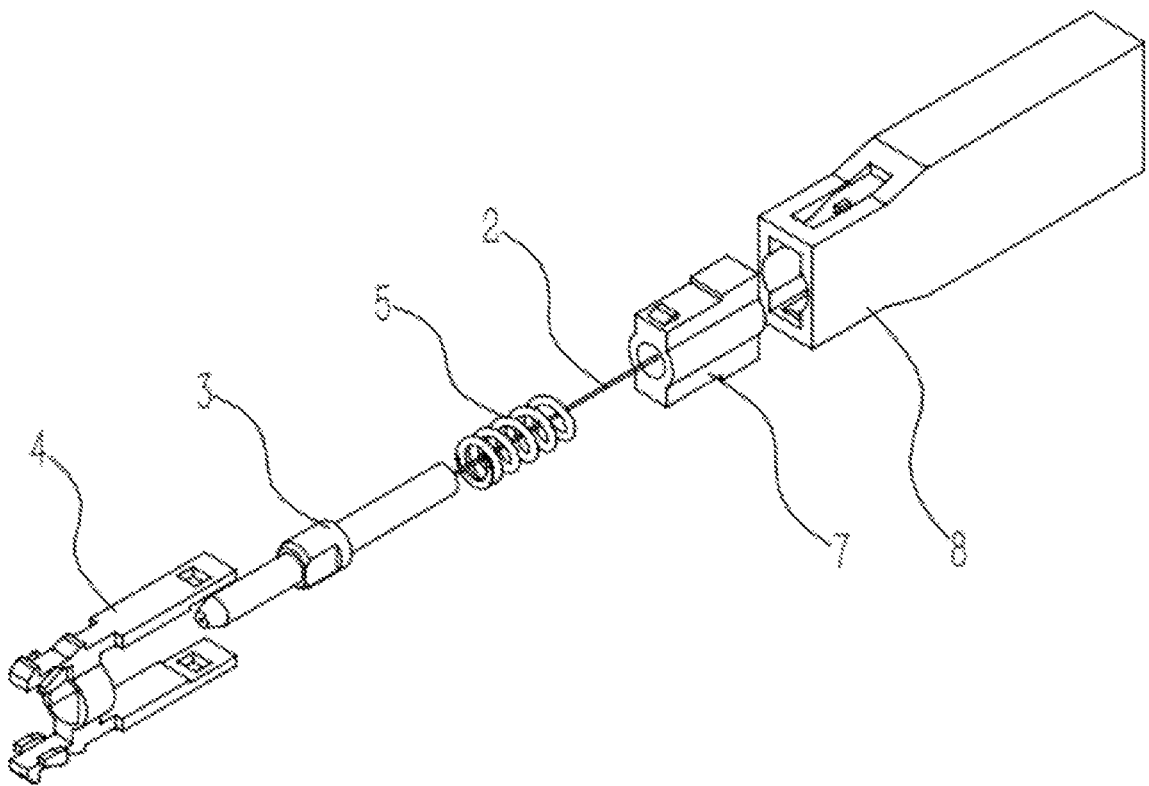
FIG. 2 is a schematic exploded structural diagram of a connector and its assembly.
Figure 3:
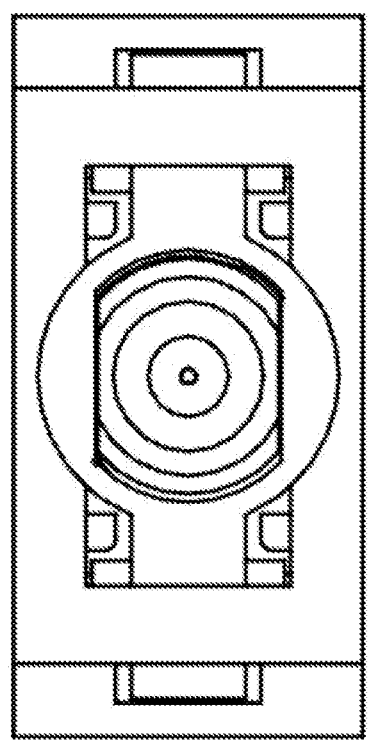
FIG. 3 is a schematic side structural diagram of a connector terminal.
Figure 4:
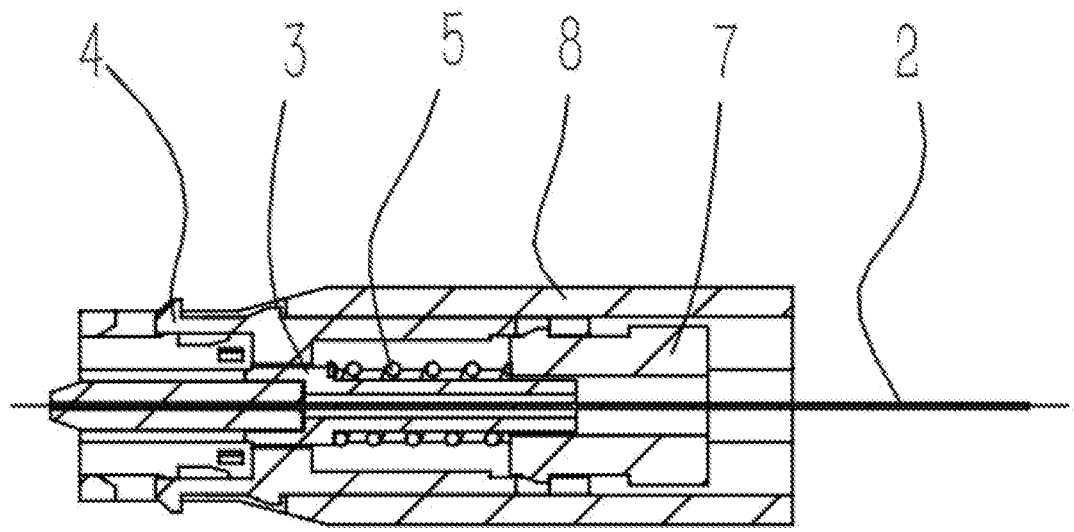
FIG. 4 is a schematic sectional structural diagram of a connector and its assembly.
Figure 5:
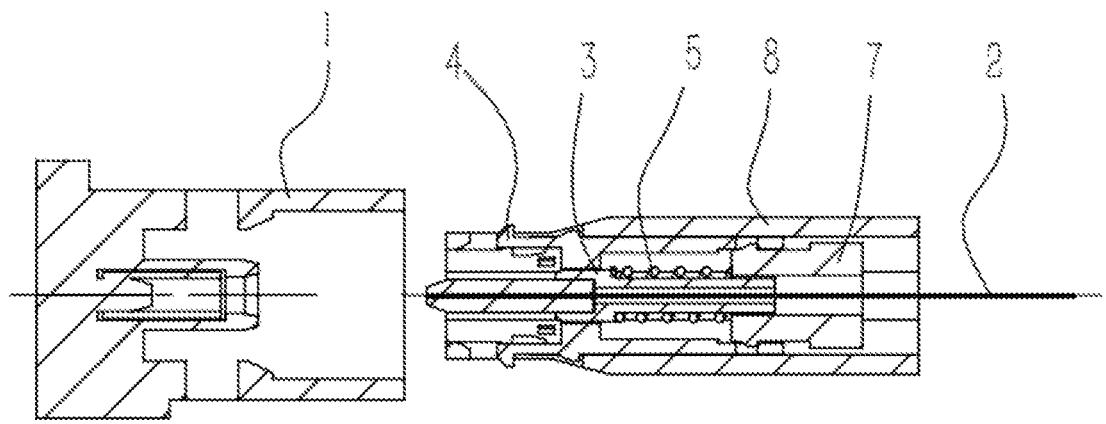
FIG. 5 is a schematic sectional exploded diagram of a connector and its assembly.
Figure 6:
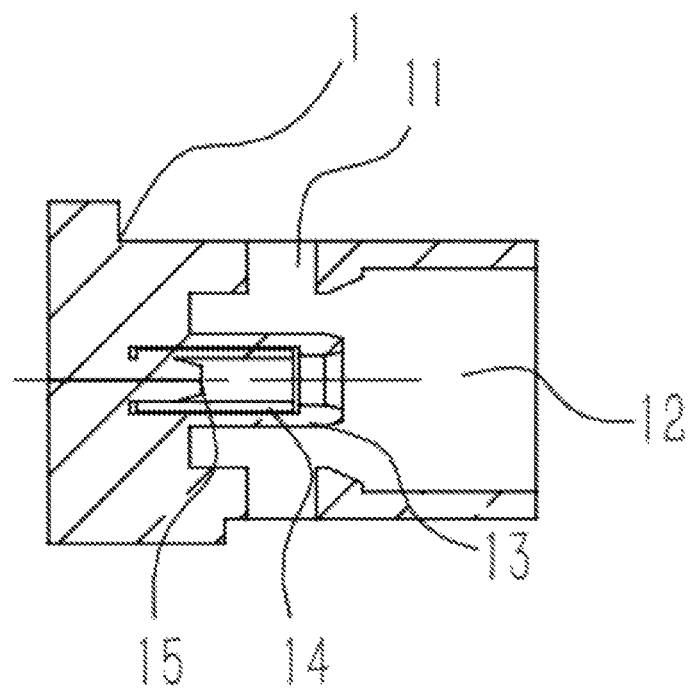
FIG. 6 is a schematic sectional diagram of an adapter terminal.

Reference numerals in the figures: 1. Adapter housing; 11. Locking structure; 12. Connection cavity; 13. Collimation sleeve retainer; 14. Collimation sleeve; 15. Connection end; 2. Optical fiber; 3. Tail handle; 31. Ferrule; 32. Front segment; 33. Matching portion; 34. Butting step; 35. Rear segment; 4. Locking fastener; 41. Forward extension arm; 411. Elastic catch; 412. Retreat boss; 42. First orientation hole; 43. Body portion; 44. Forward pushing boss; 45. Rear pull arm; 451. Clamping hole; 5. Pretightening elastic member; 7. Backstop; 71. Second orientation hole; 72. Backstop front end surface; 73. Clamping table; 74. Step; 75. Backstop side surface; 8. Connection housing; 81. First slot; 82. Through structure; 83. Matching boss; 84. Matching guide groove; and 85. Guide structure.

DETAILED DESCRIPTION OF THE EMBODIMENTS

The present disclosure will be further described below with reference to the accompanying drawings and specific embodiments.

It should be noted here that the description of these examples is used to help understand the present disclosure, but does not constitute a limitation to the present disclosure. The specific structural and functional details disclosed herein are only used to describe illustrative examples of the present disclosure. However, the present disclosure may be embodied in many alternative forms, and it should not be understood that the present disclosure is limited to the examples set forth herein.

The terms used herein are only used to describe specific examples, and are not intended to limit illustrative examples of the present disclosure. As used herein, the singular forms "a", "an", and "the" are intended to include plural forms, unless the context clearly indicates the opposite. It should also be understood that the terms "include", "includes", "comprises", and/or "comprises", when used herein, specify the existence of the stated features, integers, steps, operations, units, and/or components, which do not exclude the existence or addition of one or more other features, quantities, steps, operations, units, and components, and/or combinations thereof.

It should also be noted that, in some alternative examples, the functions/actions may appear in an order different from that shown in the figures. For example, some involved functions/actions may actually be executed substantially concurrently, or sometimes two figures shown in succession may be executed in a reverse order.

Specific details are provided in the following description to facilitate a complete understanding of the illustrative examples. However, those of ordinary skill in the art should understand that the illustrative examples can be implemented without these specific details. For example, the system may be shown in a block diagram to avoid the problem that an example is illustrated unclearly due to unnecessary details. In other examples, well-known procedures, structures, and technologies may not be shown in unnecessary details to avoid making the illustrative examples unclear.

Embodiment 1

As shown in FIG. 1 to FIG. 6 and FIG. 13, this embodiment discloses a fiber optic connector and its assembly, including a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

According to the disclosed connector and its assembly, the adapter terminal is set to be capable of resisting electromagnetic interference, and the connector terminal is configured to perform connection and fixation, thereby solving the current defect of electromagnetic interference when a plurality of fiber optic connectors are connected in parallel. Meanwhile, the arranged locking fastener provides a secure connection in one directional dimension, and only needs to move forward or backward to implement connection or disconnection of the connector terminal and the adapter terminal, thereby avoiding complicated multi-directional operation to implement the connection. Moreover, such a locking fastener structure makes the size of the connector terminal extend in a longitudinal direction and reduce in a transverse width, such that the connector has a plurality of optical fibers connected in parallel within a smaller size, thereby meeting the current packaging size requirements.

Figure 7:
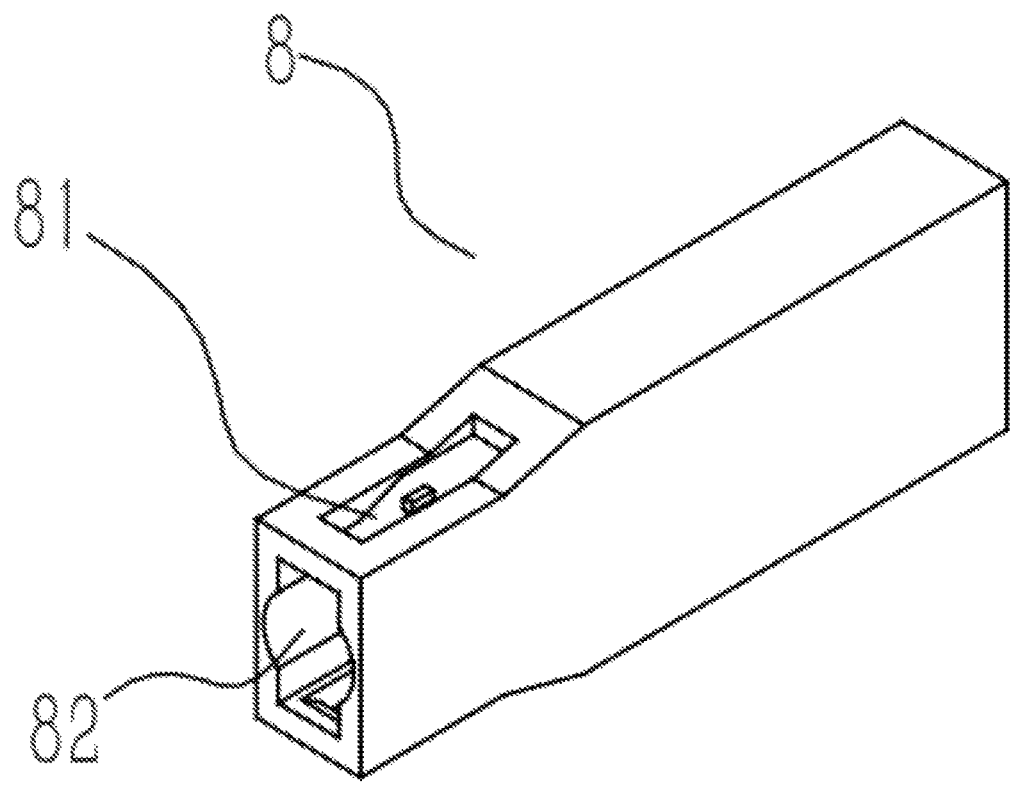
FIG. 7 is a schematic diagram showing an overall structure of a connection housing.
Figure 8:
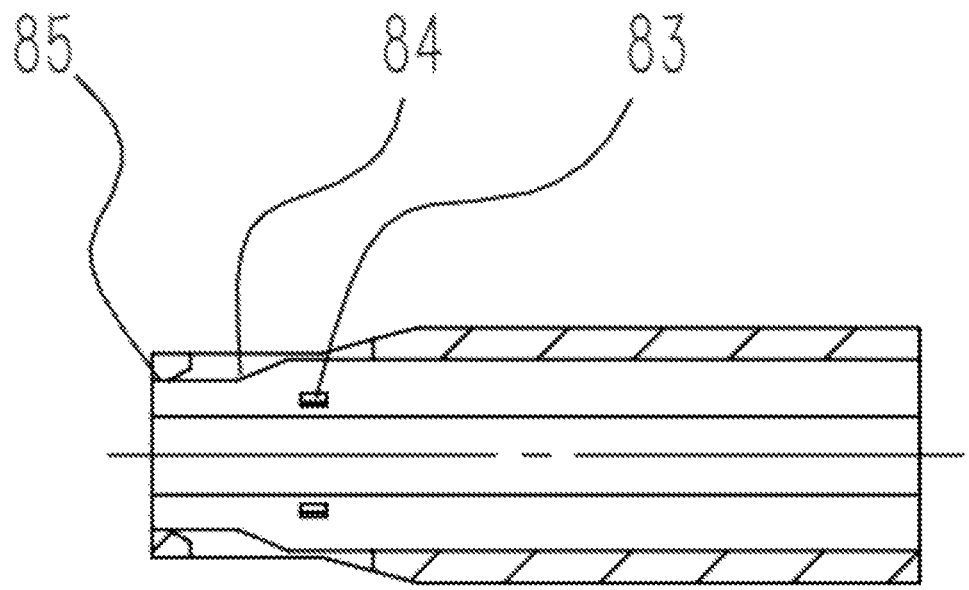
FIG. 8 is a schematic sectional structural diagram of a connection housing.

When the connection housing 8 and the adapter terminal are connected, the size of the connection housing 8 can be set to be smaller than that of the adapter terminal, which has the advantage of making the junction cleaner and smaller in size. Specifically, to optimize the structure of the connection housing 8, the following feasible solution is listed: as shown in FIG. 7 and FIG. 8, the connection housing 8 includes a front part and a rear part, a width of the front part is smaller than that of the rear part, the width of a transitional junction from the front part to the rear part gradually increases, and the front part is inserted into the connection cavity 12 and locked.

The above technical solution explains a structure that the elastic catch 411 of the locking fastener extends from a side wall of the connection housing 8 and can be rebounded and retracted relative to the connection housing 8. The above effect can be achieved in various ways. The following feasible solution is listed herein: first slot 81 is formed in a side wall at the front part of the connection housing, and the elastic catch 411 of the locking fastener extends from the first slot 81 and can be elastically retracted into the first slot 81.

Figure 9:
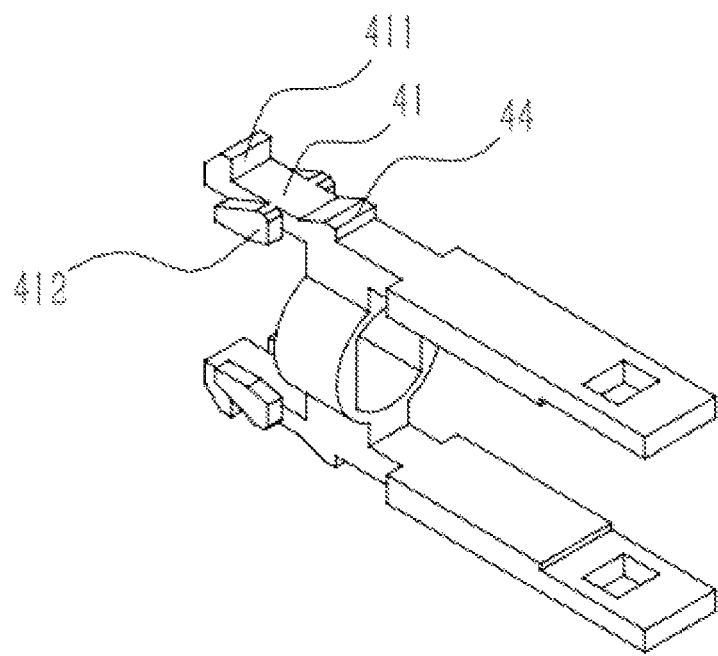
FIG. 9 is a schematic diagram showing an overall structure of a locking fastener.
Figure 10:
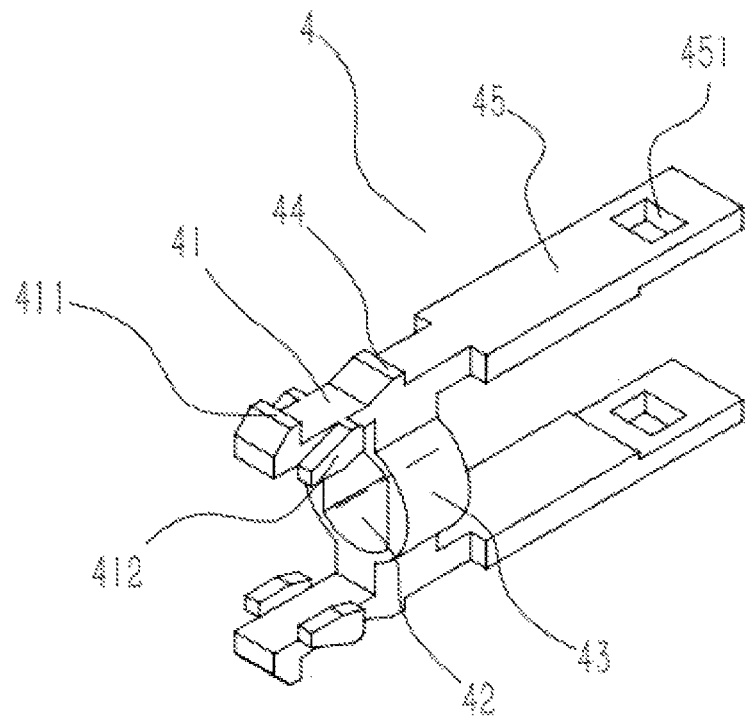
FIG. 10 is a schematic diagram showing an overall structure of a locking fastener from another perspective.

As shown in FIG. 9 and FIG. 10, in this embodiment, the first slots 81 are symmetrically arranged on the connection housing 8. When the connection housing 8 is configured as a square structure, the first slots 81 can be arranged on upper and lower side walls of the connection housing 8, then two corresponding elastic catches 411 can be synchronously arranged and respectively extend from the upper and lower first slots 81. Such arrangement can not only realize cooperative locking between the elastic catch 411 and the adapter terminal, but also make the locking fastener 4 extend in an up-down direction, which reduces the width of the locking fastener 4 and further reduces the overall width of the connection housing 8.

In this embodiment, through structure 82 is provided inside the connection housing 8, and the locking fastener 4, the ferrule assembly, and the backstop 7 are all arranged in the through structure 82. To facilitate the insertion between the connection housing 8 and the adapter housing 1, guide structure 85 is provided at an opening of the through structure 82 at front segment 32 of the connection housing 8, and the guide structure can guide by an inclined surface to facilitate smooth insertion.

The structure of the locking fastener disclosed in the above technical solution is optimized to achieve a connection function. The following feasible solution is listed herein: the locking fastener includes body portion 43 and a plurality of forward extension arms 41 provided on the body portion 43, the body portion 43 is provided with first orientation hole 42, and the elastic catch 411 is disposed on the forward extension arm 41. When the ferrule assembly is arranged, the first orientation hole 42 is configured to perform fixation and guidance to ensure that after the connector terminal is in abutting joint with the adapter terminal, the ferrule assembly advances in a predetermined direction and is aligned and connected to the adapter port of the adapter terminal.

When the connector terminal is aligned and connected to the adapter terminal, the connection housing 8 is held by hand, and is pushed into the connection cavity 12 of the adapter terminal. During forward movement of the connection housing 8, the connection housing 8 drives the locking fastener to move forward. To realize this cooperative relationship, various feasible solutions can be adopted. The following feasible solution is listed: the forward extension arm 41 is provided with forward pushing boss 44, the forward pushing boss 44 is in contact with a rear side wall of the first slot 81, and when the connection housing 8 moves forward to be inserted into the connection cavity 12, the first slot 81 is matched with the forward pushing boss 44 and drives the locking fastener 4 to move forward to push the elastic catch 411 to the locking structure 11 to implement matching.

After the locking fastener moves forward, the forward extension arm 41 and the adapter terminal are connected and matched, a structure on the forward extension arm 41 is connected to the adapter terminal to implement clamping, and a role in preventing loosening and retreat can be played. A feasible solution is listed herein: the forward extension arm 41 is provided with retreat boss 412, the connection housing 8 is provided with a retreat matching structure matched with the retreat boss 412, and when the connection housing 8 retreats away from the connection cavity 12, the retreat matching structure pushes the retreat boss 412 and enables elastic deformation of the forward extension arm 41 to remove the matching between the elastic catch 411 and the locking structure 11.

In this embodiment, the retreat bosses 412 are symmetrically arranged on both sides of the forward extension arm 41, and corresponding retreat inclined surfaces are provided on the retreat bosses 412. The retreat inclined surfaces are in contact with the retreat matching structure on the connection housing 8 to push the retreat bosses 412 to move laterally, such that the forward extension arm 41 is bent into the connection housing 8, the elastic catch 411 sinks into the connection housing 8, and the matching between the elastic catch 411 and the locking structure 11 is removed.

The retreat matching structure guides the lateral movement of the retreat bosses 412 to drive the forward extension arm 41 to bend, such that the forward extension arm 41 automatically sinks. The retreat matching structure disclosed in the above technical solution is optimized herein. The following feasible solution is listed: the retreat matching structure includes matching boss 83, and the matching boss 83 is matched with the retreat boss 412 and drives the elastic deformation of the forward extension arm 41 to sink the elastic catch 411 into the first slot 81.

In this embodiment, the matching boss 83 is arranged on the inner side wall of the connection housing 8. When the matching between the connector terminal and the adapter terminal needs to be removed, the connection housing 8 is pulled outward, and at this time, the matching boss 83 pushes the retreat boss 412 to drive deformation of the forward extension arm 41, thereby removing the connection between the elastic catch 411 and the locking structure 11. Similarly, the principle of the matching groove is also the same.

Figure 11:
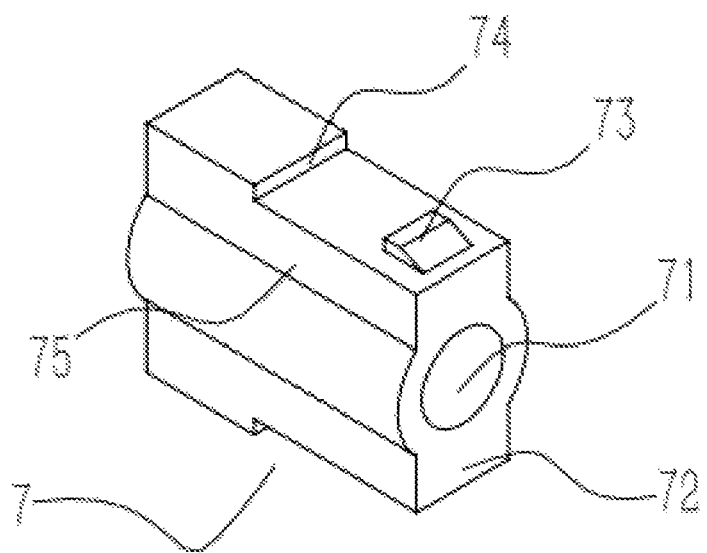
FIG. 11 is a schematic diagram showing an overall structure of a backstop.

As shown in FIG. 11, the backstop 7 and the locking fastener 4 cooperate to orient the ferrule assembly, and the backstop 7 can be oriented through the connection housing 8 or the locking fastener 4. Therefore, the body portion 43 disclosed in the above technical solution is optimized. The following feasible solution is listed: the body portion 43 is provided with rear pull arm 45, and the backstop 7 is connected and fixed to the rear pull arm 45, is provided with second orientation hole 71, and is in clamping fit with the rear pull arm 45.

Figure 12:
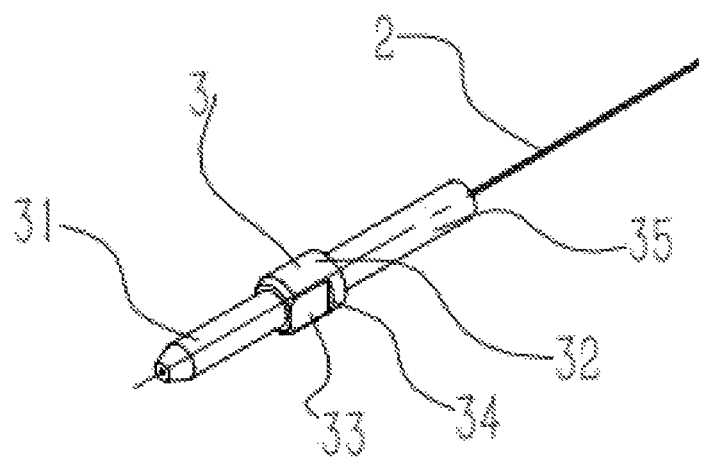
FIG. 12 is a schematic structural diagram of a ferrule assembly.
Figure 13:
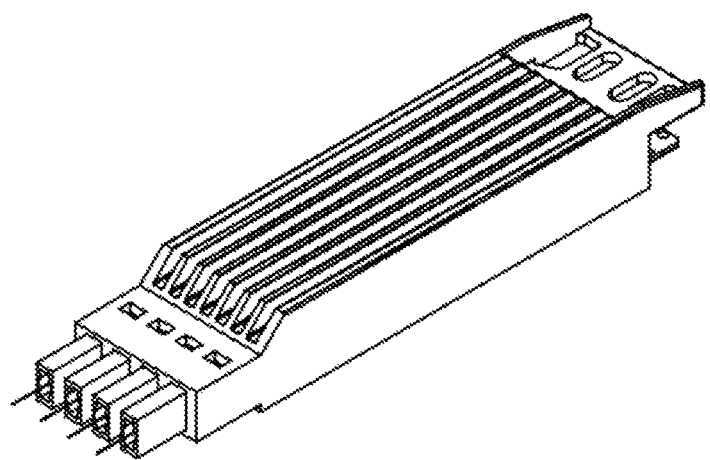
FIG. 13 is a schematic diagram of connection in parallel of a plurality of connector terminals.

As shown in FIG. 12, the structure of the ferrule assembly disclosed in the above technical solution is optimized. The following feasible solution is listed: the ferrule assembly includes tail handle 3 matched with the first orientation hole 42 and the second orientation hole 71, the tail handle 3 is further provided with pretightening elastic member 5, the pretightening elastic member 5 has one terminal butting against backstop front end surface 72 and the other end butting against the tail handle 3, ferrule 31 is sleeved in the tail handle 3, and an optical fiber 2 is connected into the ferrule 31.

During matching, a step 74 matching structure is provided between upper and lower end surfaces of the backstop 7 and the rear pull arm 45, a step 74 protrusion is provided on the backstop 7, and a step 74 recess is provided on the rear pull arm 45. Backstop side surface 75 includes a plane fitting portion and a curved surface fitting portion, which are both fitted with an inner side of the through structure 82 of the connection housing 8.

In this embodiment, the pretightening elastic member 5 is a spring.

In this embodiment, the tail handle 3 includes front segment 32 and rear segment 35. The front segment 32 is sleeved with the first orientation hole 42, and the rear segment 35 is sleeved with the second orientation hole 71. The size of the front segment 32 is larger than that of the rear segment 35, and then the pretightening elastic member 5 abuts against a junction between the front segment 32 and the rear segment 35.

The locking structure 11 disclosed in the above technical solution is optimized. The following feasible solution is listed: the locking structure 11 includes a locking groove or a locking hole, the locking groove or the locking hole is communicated with the connection cavity 12, and when the forward extension arm 41 extends into the connection cavity 12 and is locked, the elastic catch 411 is snap-fitted into the locking groove or the locking hole.

Embodiment 2

This embodiment discloses a fiber optic 2 connector and its assembly, and is the same as Embodiment 1 as follows: the connector includes a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

This embodiment differs from Embodiment 1 by optimizing the retreat matching structure. Specifically: the retreat matching structure includes matching guide groove 84, and the matching guide groove 84 is matched with the retreat boss 412 and drives elastic deformation of the forward extension arm 41 to sink the elastic catch 411 into the first slot 81.

Other structures and connection relationships in this embodiment are the same as those in Embodiment 1, which will not be repeated herein.

Embodiment 3

This embodiment discloses a fiber optic 2 connector and its assembly, and is the same as Embodiment 1 as follows: the connector includes a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

This embodiment differs from Embodiment 1 by optimizing a matching structure of the backstop 7 and the rear pull arm 45. The following feasible solution is listed: the backstop 7 is in clamping fit with the rear pull arm 45.

In this embodiment, the rear pull arm 45 is provided with clamping hole 451, and the backstop 7 is provided with clamping table 73 correspondingly matched with the clamping hole 451. The rear pull arms 45 are arranged in groups to clamp and fasten the backstop 7.

Other structures and connection relationships in this embodiment are the same as those in Embodiment 1, which will not be repeated herein.

Embodiment 4

This embodiment discloses a fiber optic 2 connector and its assembly, and is the same as Embodiment 1 as follows: the connector includes a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

This embodiment differs from Embodiment 1 by optimizing the structure of the ferrule assembly. The following feasible solution is listed: the front segment 32 of the tail handle 3 is provided with matching portion 33 and butting step 34, the matching portion 33 of the front segment 32 extends into the first orientation hole 42 to implement matching, and the butting step 34 is attached to an opening of the first orientation hole 42 to implement butting fit.

Other structures and connection relationships in this embodiment are the same as those in Embodiment 1, which will not be repeated herein.

Embodiment 5

This embodiment discloses a fiber optic 2 connector and its assembly, and is the same as Embodiment 1 as follows: the connector includes a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 which may be made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

This embodiment differs from Embodiment 1 by optimizing the structure of the adapter terminal. The following feasible solution is listed:

In this embodiment, the adapter port of the adapter includes collimation sleeve retainer 13 and collimation sleeve 14. The collimation sleeve 14 is disposed in the collimation sleeve retainer 13 of the connection cavity 12. The collimation sleeve retainer 13 extends forward to form an adapter front end part, and extends rearward to form an adapter rear end part. The adapter rear end part is configured to receive the fiber optic 2 connector or the existing common fiber optic 2 connector or other light guide components. Connection end 15 in abutting joint with the optical fiber 2 is provided in the collimation sleeve 14.

Besides, the adapter front end part is configured to receive the fiber optic 2 connector, and the adapter rear end part is configured to be an active module.

Specifically, the fiber optic 2 connector may be a calibration LC connector, an SC connector, an ST connector, an FC connector, an MPO connector, and other connectors.

An adapter fixing member is configured to be a matching structure adapted to a calibration LC connector, an SC connector, an ST connector, an FC connector, an MPO connector, and other connectors.

The collimation sleeve retainer 13 includes at least one connection protrusion configured to be a structure connecting the ferrule assembly. Relatively, the ferrule assembly is characterized by including at least one connection groove configured to be in buckle connection with the connection protrusion such that the collimation sleeve retainer 13 and the ferrule assembly form a space receiving the collimation sleeve 14.

Other structures and connection relationships in this embodiment are the same as those in Embodiment 1, which will not be repeated herein.

Embodiment 6

This embodiment discloses a fiber optic 2 connector and its assembly, and is the same as Embodiment 1 as follows: the connector includes a connector terminal and an adapter terminal. The connector terminal includes connection housing 8, a ferrule assembly is provided in the connection housing 8, and a locking fastener and backstop 7 configured to fix the ferrule assembly are further provided in the connection housing 8. The locking fastener includes elastic catch 411 extending from a side wall of the connection housing 8. The adapter terminal includes adapter housing 1 made of an electromagnetic shielding material. The adapter housing 1 is provided with connection cavity 12 corresponding to the connection housing 8, locking structure 11 matched with the elastic catch 411 is provided in the connection cavity 12, and an adapter port in abutting joint with the ferrule assembly is further provided in the connection cavity 12.

Figure 14:
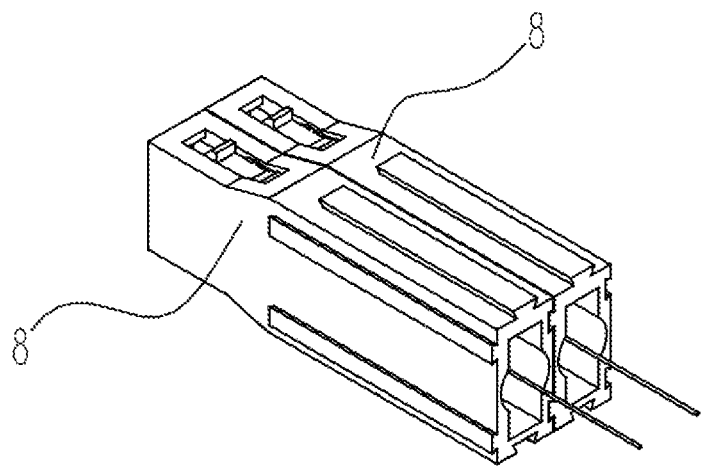
FIG. 14 is a first schematic structural diagram of connection of a connection housing through a connection protrusion and a connection groove.

This embodiment differs from Embodiment 1 by optimizing the structure of the connection housing 8. The following feasible solution is listed:

In this embodiment, the connection housing 8 is provided with a connection protrusion and a connection groove, and two adjacent connection housings 8 can be tightly connected through the connection protrusions and the connection grooves arranged correspondingly. Specifically, as shown in FIG. 14, when two adjacent connection housings 8 are close to each other and connected in a width direction, a connection protrusion is provided on one of the connection housings 8, and a connection groove is provided on the other connection housing 8. The connection protrusions and the connection grooves are employed to stably connect two adjacent connection housings 8 by means of clamping, buckling or other modes to improve the stability.

Figure 15:
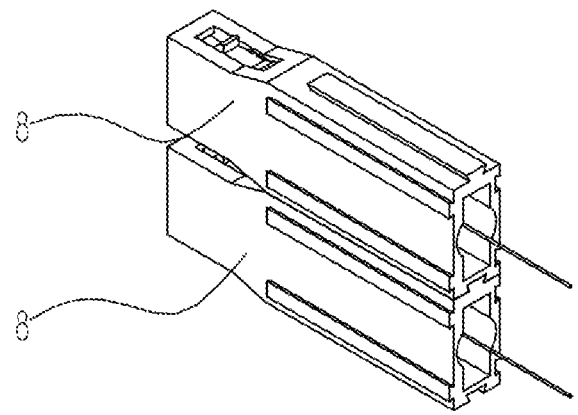
FIG. 15 is a second schematic structural diagram of connection of a connection housing through a connection protrusion and a connection groove.

In addition, as shown in FIG. 15, when two adjacent connection housings 8 are close to each other and connected in a height direction, a connection protrusion is provided on one of the connection housings 8, and a connection groove is provided on the other connection housing 8. The connection protrusions and the connection grooves are employed to stably connect two adjacent connection housings 8 by means of clamping, buckling or other modes to improve the stability.

Figure 16:
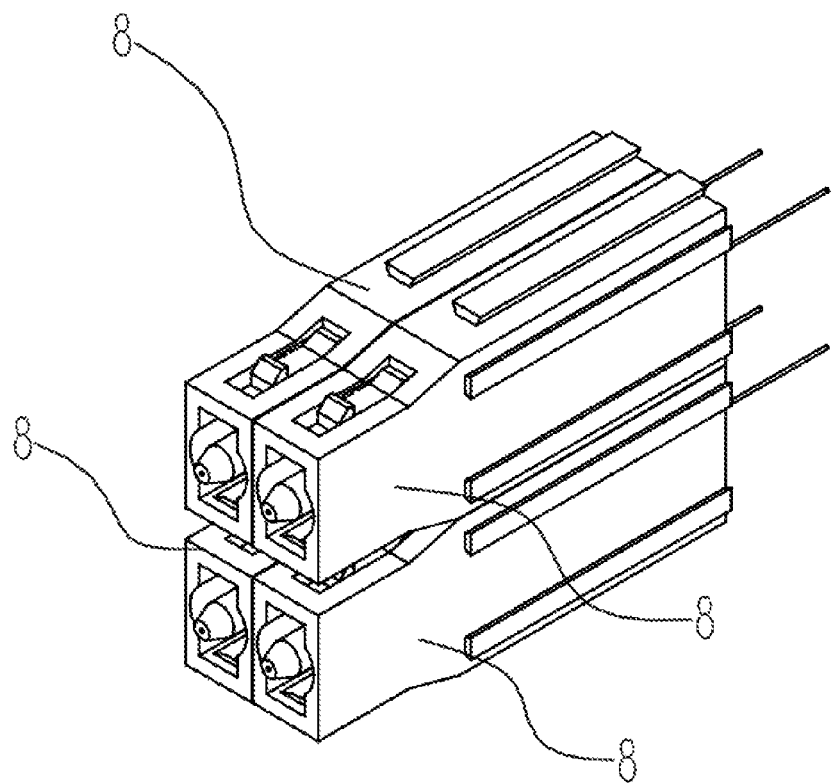
FIG. 16 is a third schematic structural diagram of connection of a connection housing through a connection protrusion and a connection groove.

Similarly, the combined connection of the connection housings 8 can also be implemented in the width direction and the height direction at the same time, as shown in FIG. 16.

Embodiment 7

Figure 17:
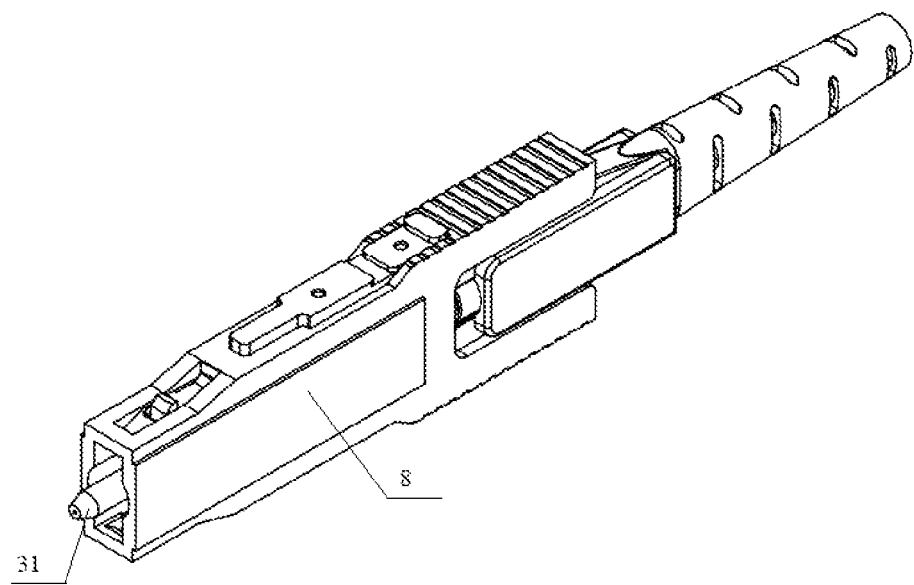
FIG. 17 is a schematic structural diagram of a single-core fiber optic connector.

This embodiment discloses a single-core fiber optic connector. As shown in FIG. 17, a ferrule assembly corresponding to the ferrule 31 is provided in the connection housing 8, such that there is one ferrule assembly. In addition, there may also be one elastic catch 411 provided on the locking fastener 4, and the connector terminal can be matched with the locking structure 11 of the adapter terminal through a unilateral elastic buckle.

Embodiment 8

Figure 18:
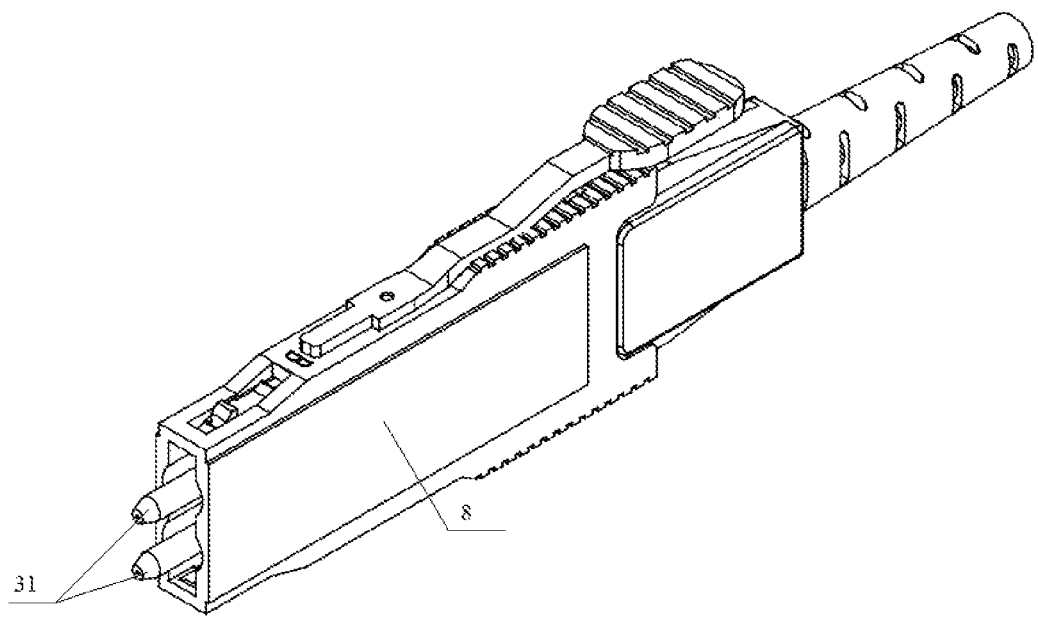
FIG. 18 is a schematic structural diagram of a double-core fiber optic connector.
Figure 19:
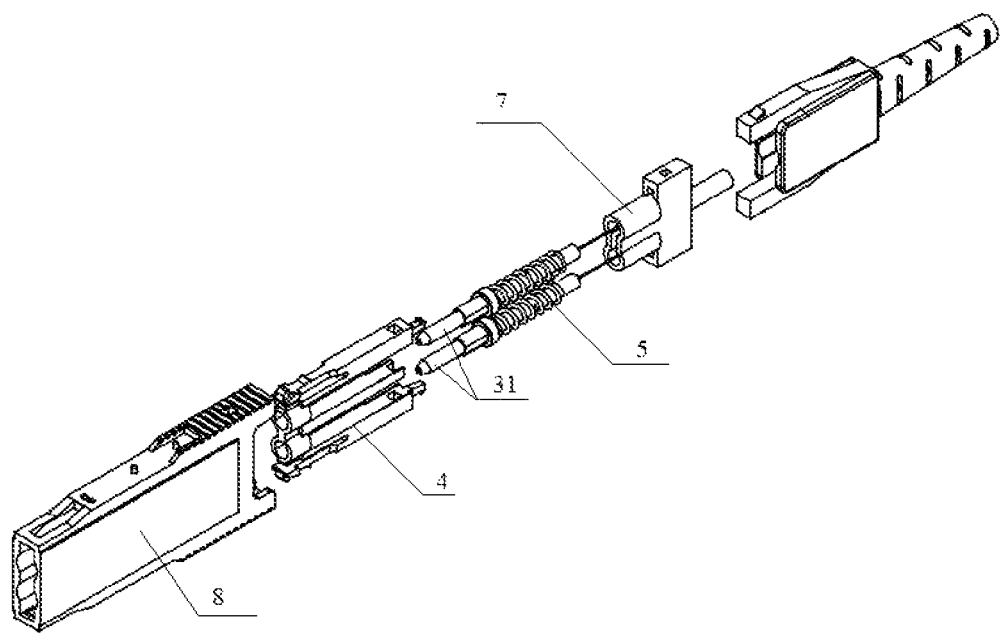
FIG. 19 is a schematic exploded diagram of a double-core fiber optic connector.

This embodiment discloses a double-core fiber optic connector. As shown in FIG. 18 and FIG. 19, ferrule assemblies in one-to-one correspondence with two ferrules 31 are provided in the connection housing 8, such that there are two ferrule assemblies. In addition, there may also be one elastic catch 411 provided on the locking fastener 4, and the connector terminal can be matched with the locking structure 11 of the adapter terminal through a unilateral elastic buckle.

Embodiment 9

Figure 20:
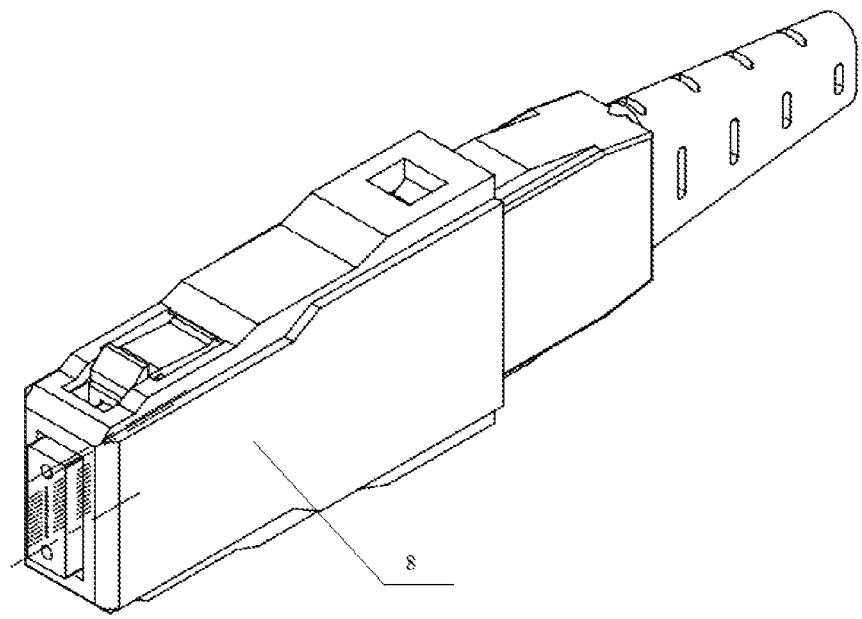
FIG. 20 is a schematic structural diagram of a multi-core fiber optic connector.
Figure 21:
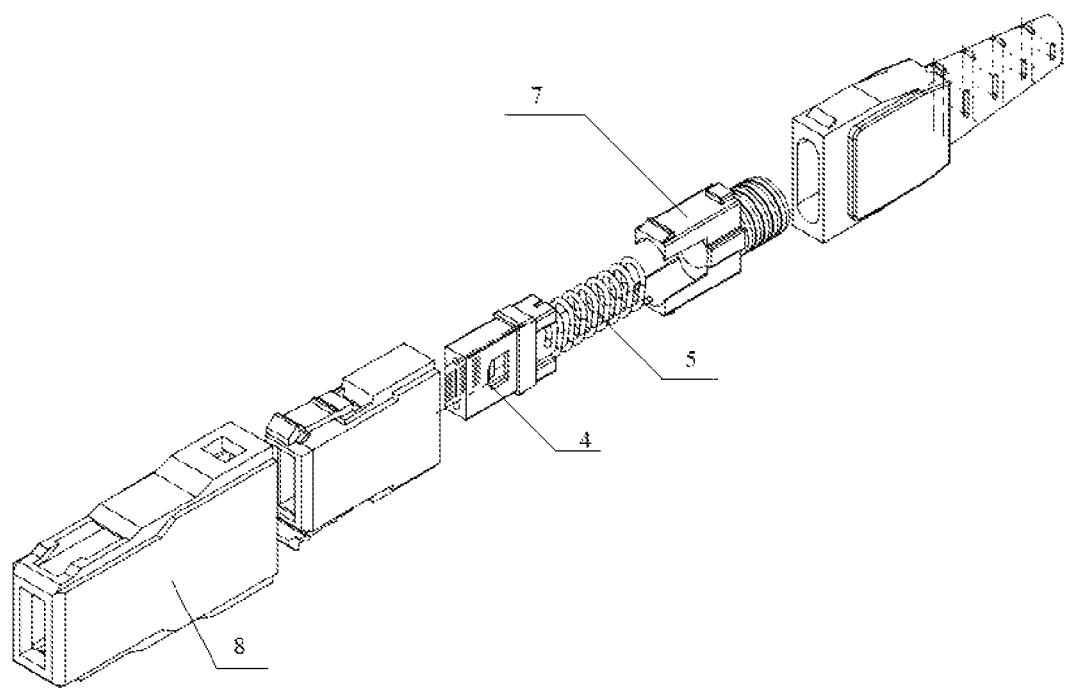
FIG. 21 is a schematic exploded diagram of a multi-core fiber optic connector.
Figure 22:
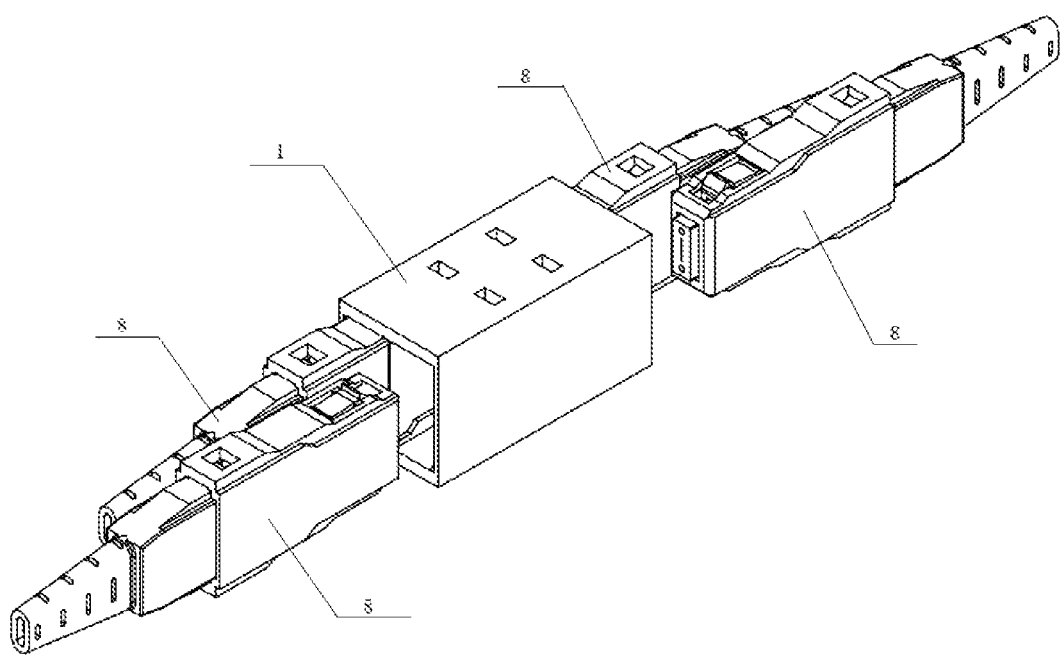
FIG. 22 is a schematic diagram of connection between a multi-core fiber optic connector and an adapter.
Figure 23:
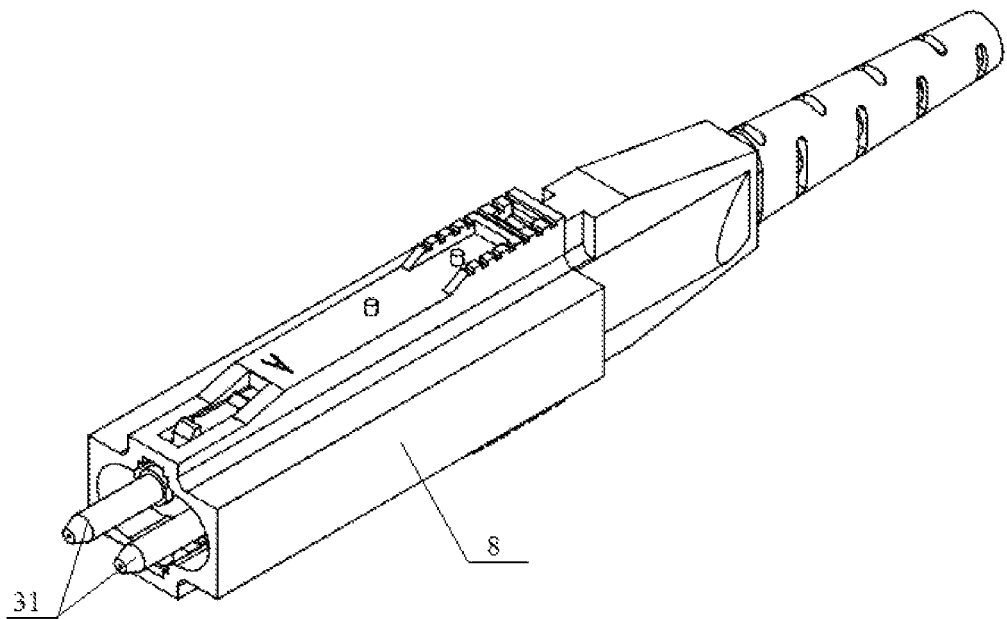
FIG. 23 is a schematic structural diagram of a fiber optic connector having double cores arranged horizontally.
Figure 24:
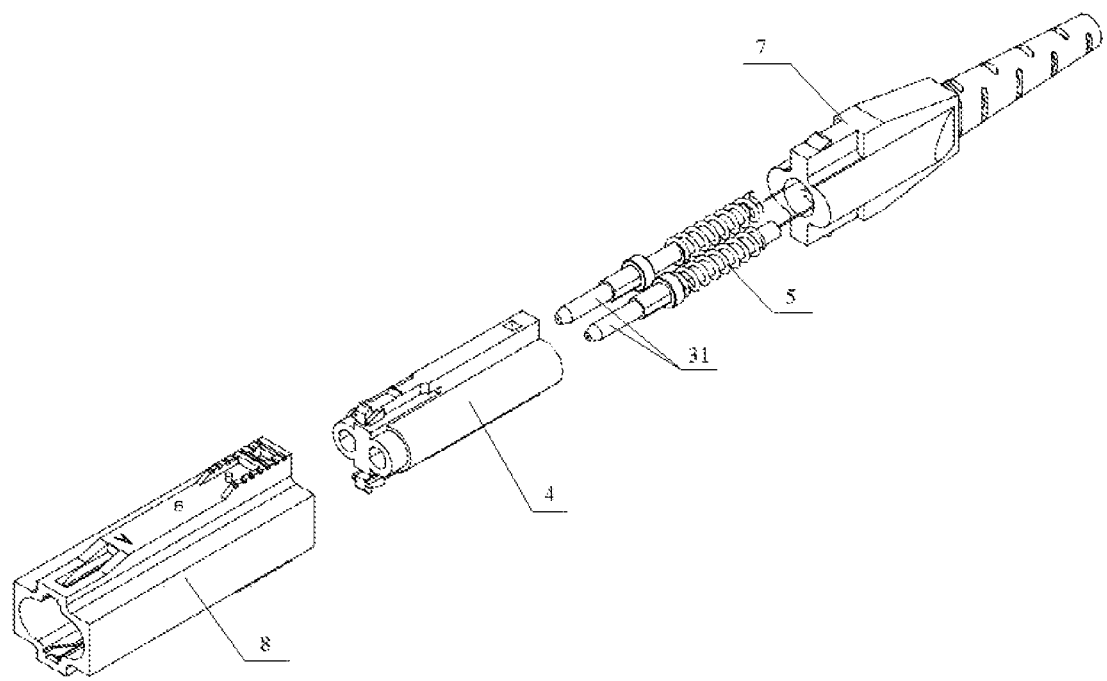
FIG. 24 is a schematic exploded diagram of a fiber optic connector having double cores arranged horizontally.

This embodiment discloses a multi-core fiber optic connector. As shown in FIG. 20 to FIG. 22, multi-core plastic ferrules in one-to-one correspondence with one pretightening elastic member 5 are provided in the connection housing 8, such that there is one ferrule assembly, and a plurality of optical fibers 2 are included in the multi-core plastic ferrules. In addition, there may also be one elastic catch 411 provided on the locking fastener 4, and the connector terminal can be matched with the locking structure 11 of the adapter terminal through a unilateral elastic buckle.

Embodiment 10

Figure 25:
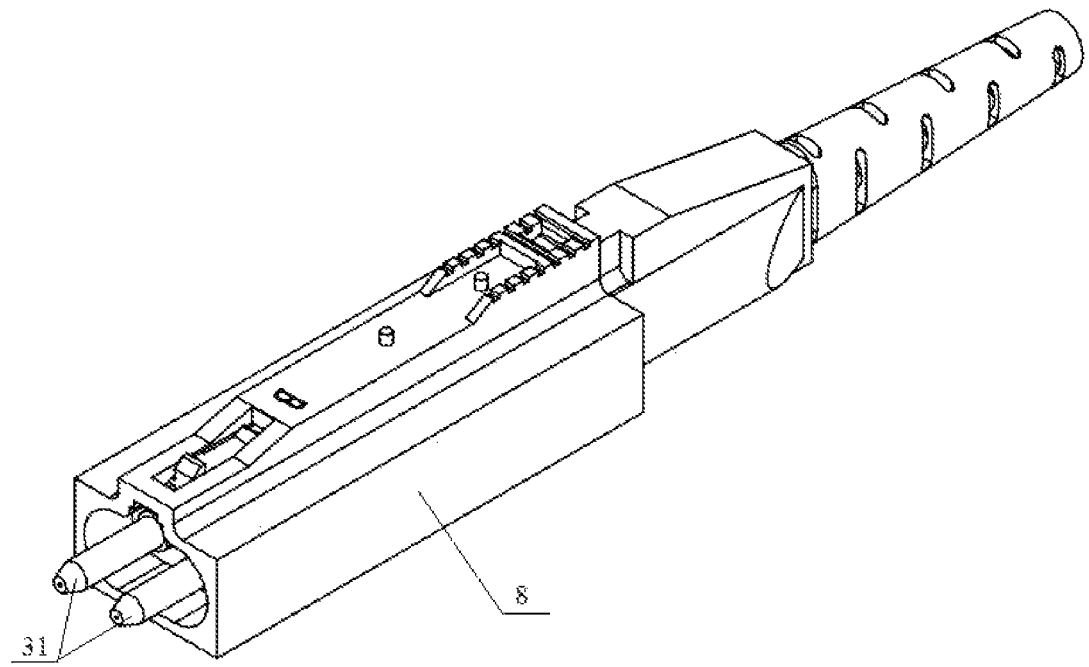
FIG. 25 is a schematic structural diagram of a fiber optic connector having double cores arranged horizontally and unilateral snap-fitting.
Figure 26:
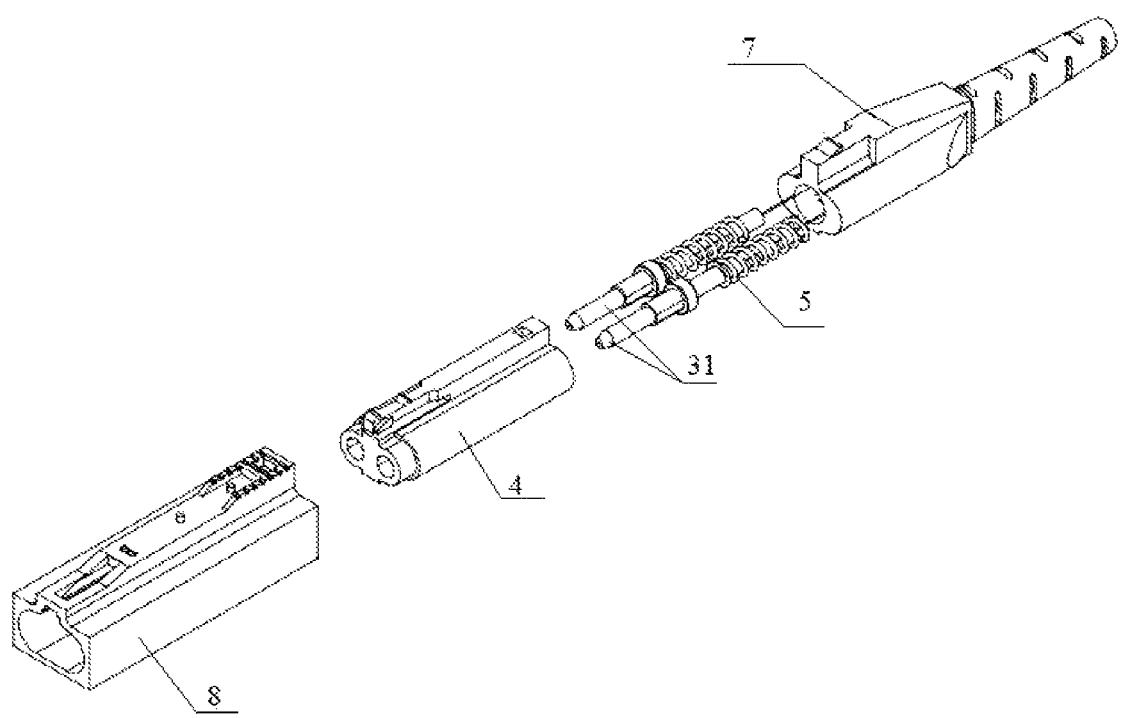
FIG. 26 is a schematic exploded diagram of a fiber optic connector having double cores arranged horizontally and unilateral snap-fitting.

This embodiment discloses a fiber optic connector having double cores arranged horizontally, and differs from Embodiment 8 where double cores are arranged vertically. As shown in FIG. 23 to FIG. 26, ferrule assemblies in one-to-one correspondence with two ferrules 31 arranged horizontally are provided in the connection housing 8, such that there are two ferrule assemblies. In addition, as shown in FIG. 25 and FIG. 26, there is one elastic catch 411 provided on the locking fastener 4, and the connector terminal can be matched with the locking structure 11 of the adapter terminal through a unilateral elastic buckle.

The above are the implementations listed in the present disclosure, but the present disclosure is not limited to the above optional implementations. Those skilled in the art can obtain various implementations by any combination of the above implementations, and anyone can obtain other various implementations under the enlightenment of the present disclosure. The above specific implementations should not be construed as limiting the protection scope of the present disclosure, and the protection scope of the present disclosure should be defined by the claims. Moreover, the description can be used to interpret the claims.

What is claimed is:

1. A fiber optic connector, comprising a connector terminal and an adapter terminal, wherein
   the connector terminal comprises a connection housing, at least one ferrule assembly is provided in the connection housing, a locking fastener are further provided in the connection housing, wherein the locking fastener is configured to fix the at least one ferrule assembly, the locking fastener comprises a body portion and a plurality of forward extension arms extending forward, provided on the body portion, and at least one elastic catch is disposed on each of the plurality of forward extension arms,
   the locking fastener comprises the at least one elastic catch extending from a side wall of the connection housing,
   the adapter terminal comprises an adapter housing, the adapter housing is provided with a connection cavity corresponding to the connection housing, a locking structure matched with the at least one elastic catch is provided in the connection cavity, an adapter port in abutting joint with the at least one ferrule assembly is further provided in the connection cavity, and the connector terminal moves forward or backward in a straight line to be connected to or disconnected from the adapter terminal;
   wherein a first slot is formed in a side wall of the connection housing, and the at least one elastic catch of the locking fastener extends from the first slot and is allowed to elastically retract into the first slot;
   wherein the locking fastener comprises the body portion and the plurality of forward extension arms provided on the body portion, the body portion is provided with a first orientation hole, and the at least one elastic catch is disposed on each of the plurality of forward extension arms;
   wherein each of the plurality of forward extension arms is provided with a forward pushing boss, the forward pushing boss is in contact with a rear side wall of the first slot, and when the connection housing moves forward to be inserted into the connection cavity, the connection housing is matched with the forward pushing boss and drives the locking fastener to move forward to push the at least one elastic catch to the locking structure to implement a matching.

2. The fiber optic connector according to claim 1, wherein the body portion is provided with a rear pull arm, and a backstop is connected and fixed to the rear pull arm, is provided with a second orientation hole, and is in clamping fit with the rear pull arm.

3. The fiber optic connector according to claim 1, wherein the locking structure comprises a locking groove or a locking hole, the locking groove or the locking hole is communicated with the connection cavity, and when each of the plurality of forward extension arms extends into the connection cavity and is locked, the at least one elastic catch is snap-fitted into the locking groove or the locking hole.

4. The fiber optic connector according to claim 1, wherein each of the plurality of forward extension arms is provided with a retreat boss, the connection housing is provided with a retreat matching structure matched with the retreat boss, and when the connection housing retreats away from the connection cavity, the retreat matching structure pushes the retreat boss and enables an elastic deformation of each of the plurality of forward extension arms to remove the matching between the at least one elastic catch and the locking structure.

5. The fiber optic connector according to claim 4, wherein the retreat matching structure comprises a matching boss or a matching guide groove, and the matching boss or the matching guide groove is matched with the retreat boss and drives the elastic deformation of each of the plurality of forward extension arms to sink an elastic buckle back into the first slot.

6. A fiber optic connector, comprising a connector terminal and an adapter terminal, wherein
the connector terminal comprises a connection housing, at least one ferrule assembly is provided in the connection housing, a locking fastener are further provided in the connection housing, wherein the locking fastener is configured to fix the at least one ferrule assembly, the locking fastener comprises a body portion and a plurality of forward extension arms extending forward, provided on the body portion, and at least one elastic catch is disposed on each of the plurality of forward extension arms,
the locking fastener comprises the at least one elastic catch extending from a side wall of the connection housing,
the adapter terminal comprises an adapter housing, the adapter housing is provided with a connection cavity corresponding to the connection housing, a locking structure matched with the at least one elastic catch is provided in the connection cavity, an adapter port in abutting joint with the at least one ferrule assembly is further provided in the connection cavity, and the connector terminal moves forward or backward in a straight line to be connected to or disconnected from the adapter terminal;
wherein a first slot is formed in a side wall of the connection housing, and the at least one elastic catch of the locking fastener extends from the first slot and is allowed to elastically retract into the first slot;
wherein the locking fastener comprises the body portion and the plurality of forward extension arms provided on the body portion, the body portion is provided with a first orientation hole, and the at least one elastic catch is disposed on each of the plurality of forward extension arms;
wherein each of the plurality of forward extension arms is provided with a retreat boss, the connection housing is provided with a retreat matching structure matched with the retreat boss, and when the connection housing retreats away from the connection cavity, the retreat matching structure pushes the retreat boss and enables an elastic deformation of each of the plurality of forward extension arms to remove a matching between the at least one elastic catch and the locking structure.

7. The fiber optic connector according to claim 6, wherein the retreat matching structure comprises a matching boss or a matching guide groove, and the matching boss or the matching guide groove is matched with the retreat boss and drives the elastic deformation of each of the plurality of forward extension arms to sink an elastic buckle back into the first slot.

8. A fiber optic connector, comprising a connector terminal and an adapter terminal, wherein
the connector terminal comprises a connection housing, at least one ferrule assembly is provided in the connection housing, a locking fastener are further provided in the connection housing, wherein the locking fastener is configured to fix the at least one ferrule assembly, the locking fastener comprises a body portion and a plurality of forward extension arms extending forward, provided on the body portion, and at least one elastic catch is disposed on each of the plurality of forward extension arms,
the locking fastener comprises the at least one elastic catch extending from a side wall of the connection housing,
the adapter terminal comprises an adapter housing, the adapter housing is provided with a connection cavity corresponding to the connection housing, a locking structure matched with the at least one elastic catch is provided in the connection cavity, an adapter port in abutting joint with the at least one ferrule assembly is further provided in the connection cavity, and the connector terminal moves forward or backward in a straight line to be connected to or disconnected from the adapter terminal;
wherein a first slot is formed in a side wall of the connection housing, and the at least one elastic catch of the locking fastener extends from the first slot and is allowed to elastically retract into the first slot;
wherein the locking fastener comprises the body portion and the plurality of forward extension arms provided on the body portion, the body portion is provided with a first orientation hole, and the at least one elastic catch is disposed on each of the plurality of forward extension arms;
wherein the body portion is provided with a rear pull arm, and a backstop is connected and fixed to the rear pull arm, is provided with a second orientation hole, and is in clamping fit with the rear pull arm;
wherein the at least one ferrule assembly comprises a tail handle matched with the first orientation hole and the second orientation hole, the tail handle is further provided with a pretightening elastic member, the pretightening elastic member has a first end butting against the backstop and a second end butting against the tail handle, a ferrule is sleeved in the tail handle, and an optical fiber is connected into the ferrule.

* * * * *